United States Patent Office 3,682,840
Patented Aug. 8, 1972

3,682,840
ELECTRICAL RESISTOR CONTAINING LEAD RUTHENATE
Paul R. Van Loan, Grand Island, N.Y., assignor to Air Reduction Company, Incorporated, New York, N.Y.
No Drawing. Filed Oct. 19, 1970, Ser. No. 82,161
Int. Cl. H01b 1/06; C03c 3/04
U.S. Cl. 252—518      11 Claims

ABSTRACT OF THE DISCLOSURE

Electrically resistive compositions and resistive elements are disclosed comprising lead ruthenate and mixtures thereof with ruthenium dioxide dispersed in electrically insulating inert matrices.

BACKGROUND OF THE INVENTION

Over the past several years electronics has undergone a substantial change which was brought on primarily by the discovery and development of the transistor and other solid state active elements. In view of the extended reliability of these elements, their resistance to mechanical shock and their ability to operate in environments where vacuum tubes cannot operate, impetus was given to the electronic component industry to develop passive elements suitable for use in similar applications.

In order to improve the chemical and thermal stability of electrical resistors, research was carried out to develop solid inorganic resistive elements. In view of the well-known inert character of the noble metals, inorganic resistive compositions were developed employing powdered noble metals dispersed in a glass or ceramic matrix. The inorganic compositions were then deposited on substrates to form glaze or film type resistors. The noble metals were also mixed with ceramic materials such as alumina $Al_2O_3$ or zirconia $ZrO_2$ which were then formed into cylinders or blocks under pressure followed by firing to prepare volumetric resistors.

Along with the powdered noble metals, resistor manufacturers investigated the use of metal oxides in the preparation of inorganic resistors. The oxides of palladium, thallium and ruthenium were extensively investigated and found to produce usable resistive elements.

In the manufacture of inorganic glaze and volumetric resistors using the aforementioned materials, it was noted that the processing techniques employed in manufacturing the resistors had a substantial and erratic effect on the value of the resistors produced. In general, the principal explanation for the lack of reproducibility found resides in the fact that many of the conductants set forth in the prior art evidence a lack of chemical and thermal stability, and hence are detrimentally affected in the presence of elevated firing temperatures or in the presence of the various foreign substances present in the total resistor formulation. For example, the degree of hydration of a metal oxide has a marked effect on the final resistance obtained. Furthermore, conductants such as dispersed palladium, silver, or the like, remain highly sensitive to firing temperature and to the atmosphere in which the firing takes place.

SUMMARY OF THE INVENTION

The present invention relates generally to electrical resistor compositions and the methods for the manufacture thereof, and more specifically to a new class of ceramic-like resistors based upon the incorporation therein of lead ruthenate or mixtures thereof with ruthenium dioxide. The materials specified are electrically conductive and crystalline, having a defect pyrochlore-type structure. The lead ruthenate material, which may be prepared by techniques hereinafter described, may be formulated into resistive compositions by blending with suitable inert dispersants. The compositions are then treated according to the nature of the resistor to be prepared. For example in the case of an electroconductive glaze a paste-like composition containing the dispersed lead ruthenate material is deposited via screen printing or the like in a relatively thin film on an alumina or glass substrate which is then fired at a suitable temperature to render the material into a unified, solidified structure.

As will hereinafter be illustrated, the resistors prepared in accordance with the invention display chemical and thermal stability over a wide range of processing conditions, are produced at a comparatively reasonable cost, and possess desirable electrical properties.

DESCRIPTION OF PREFERRED EMBODIMENTS

The lead ruthenate material utilized in accordance with the present invention can be prepared through a solid state sintering reaction of ruthenium dioxide, $RuO_2$, with the oxide, carbonate or nitrate of lead [$PbO$, $PbO_2$, $PbCO_3$ or $Pb(NO_3)_2$]. In accordance with this technique, equivalent amounts of lead oxide and ruthenium dioxide are mixed together and presintered for five hours, in a furnace at 800° C. The material is then ground, pelletized and refired for five hours at 850° C. The sintered pellets are then crushed and ground to yield the lead ruthenate material in a form suitable for use in preparing a resistor composition.

The lead ruthenate materials subsequent to their preparation are blended with electrically nonconductive dispersants in accordance with the resistor formulation desired. Where one desires, for example, to prepare an electroconductive glaze film, the lead ruthenate material is admixed with a glass frit and a temporary binder to yield a paste-like composition which is thereafter applied to a substrate. The coated substrate is then fired to yield an electrically resistive glaze. The film applied to the substrate preferably has a thickness of 0.2 to 2 mils, although the novel composition may be used in coatings of other thicknesses.

The glass frit used in preparing the electrically resistive compositions can be a borosilicate glass, for example, a lead aluminum borosilicate glass or a lead zinc zirconium manganese borosilicate glass. The preferred glass used in the resistor composition is a lead borosilicate glass of the following approximate composition.

| Constituent: | Weight percent |
|---|---|
| $PbO$ | 60 |
| $B_2O_3$ | 30 |
| $SiO_2$ | 4 |
| $Al_2O_3$ | 6 |

The glass serves both as a binder and as an inorganic non-conductive dispersant for the conductive lead ruthenate material.

The particle size of the glass and lead ruthenate material should be less than 325 mesh and preferably in the submicron range for more uniform dispersion and for improved reproducibility from one batch of resistive composition to the next.

In the preparation of a resistive composition for use in preparing film type resistors by screen printing or other suitable techniques, it is preferred to use a temporary binder to form a paste-like consistency. Following deposition of the paste the temporary binder is removed by evaporation in the firing operation through which the resistor is formed. Any of the common volatile binder materials can be used in preparing the paste, for example, benzol, pine oil, alpha-terpineol, beta-terpineol or dilute solutions of polyvinyl alcohol. A preferred binder is a ten percent solution of ethyl cellulose in butyl Carbitol.

A slight excess of butyl carbitol can be added, if necessary, to lower the viscosity of the paste.

The lead ruthenate material also may be prepared in situ as part of firing of the finished glaze film. Thus the desired proportions of the materials which are reacted to form the lead ruthenate ($RuO_2$ and an oxide, carbonate or nitrate of lead) are combined with the ingredients of the paste composition to be fired including the electrically non-conductive dispersant and temporary binder. Such mixture may then be applied in a suitably viscous form to a suitable high-temperature-resistant, electrically non-conductive substrate and heated sufficiently to form the lead ruthenate and to melt the dispersant and thereby forming a glaze film on the substrate. Where mixtures of the lead ruthenate with ruthenium dioxide are desired in the finished film and appropriate excess of the ruthenium dioxide is included in the paste formulation.

The following examples are illustrative of the method of preparing the conductive lead ruthenate materials as well as resistive compositions utilizing the lead ruthenate materials.

EXAMPLE 1

The compound lead ruthenate was synthesized by sintering equimolar proportions of PbO or $PbO_2$ and ruthenium dioxide $RuO_2$. The mixture was presintered in air at 800° C. for five hours, crushed, repelletized and refired at 850° C. for five hours. The resulting black discs had resistivities of less than 0.1 ohm-cm. and were found on X-ray diffraction analysis to be a defect pyrochlore-type compound with a formula $Pb_2Ru_2O_6$ and a cubic unit cell with a lattice constant $a_0=10.253A$. The diffraction pattern is as follows:

| $Pb_2Ru_2O_6$ | | |
|---|---|---|
| hkl | d (A.) | $I_{rel}$ |
| 111 | 5.94 | 12 |
| 222 | 2.97 | 100 |
| 400 | 2.57 | 60 |
| 331 | 2.35 | 25 |
| 333 | 1.977 | 15 |
| 440 | 1.817 | 60 |
| 531 | 1.74 | 9 |
| 622 | 1.549 | 55 |
| 444 | 1.484 | 25 |
| 553 | 1.336 | 3 |
| 800 | 1.285 | 15 |
| 662 | 1.178 | 25 |
| 840 | 1.148 | 23 |

A paper published by Longo, Raccah and Goodenough, Mat. Res. Bull., vol. 4, p. 191 (1969) contains data on synthesis, composition and unit cell parameters for the above compound. These data are in agreement with the above findings. According to this paper, $Pb_2Ru_2O_6$ is also prepared by reacting PbO or $Pb(NO_3)_2$ with Ru metal at 850° C. for 48 hours.

The lead ruthenate material subsequent to preparation is blended with electrically nonconductive dispersants in accordance with the resistor formulation desired. Where one desires, for example, to prepare electroconductive glaze films in accordance with the invention, the lead ruthenate materials are admixed with glass frits and temporary binders to yield a paste-like composition which in accordance with the art is thereafter utilized by applying the material to substrates or the like and firing the paste to yield the finished electroconductive glaze. This methodology is illustrated by the following example:

EXAMPLE 2

A resistive paste was prepared from this electrically conductive phase by mixing the following:

| | Weight percent |
|---|---|
| $Pb_2Ru_2O_6$ powder | 50 |
| Lead aluminum borosilicate glass frit | 50 |

This mixture was dispersed in a solution of ethyl cellulose in butyl carbitol so as to form a thixotropic, screen-printable paste. This paste was printed on sintered alumina substrates which had been preterminated with a silver conductor film. The pieces were then dried at 110° C. for 10 minutes, and fired in a belt tunnel kiln for 9 minutes at peak temperatures between 500 and 600° C.

The films were then examined for their electrical properties, with the following results:

TABLE I

| Firing temperature, °C. | Sheet resistance, ohms/ square | TCR, p.p.m./ °C. | Noise, db./ decade | Percent change in resistance at 150° C./ 1,250 hours |
|---|---|---|---|---|
| 500 | 300 | | | |
| 525 | 60 | | | |
| 550 | 60 | +900 | −9.1 | |
| 575 | 300 | +680 | +3.5 | −0.01 |
| 600 | 1.3K | | | −0.04 |

These results demonstrate that $Pb_2Ru_2O_6$ is an excellent conductive component in thick film resistive glazes.

EXAMPLE 3

A paste was prepared from the following:

| | |
|---|---|
| $RuO_2$ Grams (10% solids) | 1.00 |
| $PbO_2$ grams | 0.50 |
| Pb-Zn-Zr-Mn-borosilicate glass do | 8.10 |
| 10% ethyl cellulose solution in butyl carbitol grams | 1.00 |
| Butyl carbitol ml | 1.3 |

This paste was screen-printed on sintered 96% alumina substrates, dried, and fired at 800° C. peak temperature through a tunnel kiln, for a total firing cycle time of 18 minutes. The fired thick film strips were then found to have a sheet resistance of 56 ohms/square and a TCR of +660 p.p.m./° C. This compares to around 40 ohms/square and a TCR of +300 p.p.m. obtained for a paste containing 25 weight percent $RuO_2$ and 75% of the same Pb-Zn-Zr-Mn borosilicate glass, without the presence of free PbO or $PbO_2$. The formation of lead ruthenate during firing of the paste results in a resistive thick film which requires substantially lower concentrations of the costly conductive oxide $RuO_2$ to obtain an equivalent resistance level.

In the above example a sufficient amount of $RuO_2$ was employed in the paste formulation to produce an excess of $RuO_2$ in the finished glaze in admixture with the lead ruthenate formed during firing. However, the obtaining of an equivalent resistance level with relatively lower concentrations of costly $RuO_2$ results even if a residual excess of $RuO_2$ is not provided. The reduction of the $RuO_2$ content required for equivalent resistance levels also affords significant advantages in improved stability of the film because the higher relative proportions of the glass phase permitted by such reduction of the conductive constituents yields greater film stability.

EXAMPLE 4

It is seen that thick film resistors containing lead ruthenate tend to exhibit highly positive TCR's. In order to maintain the TCR within a more favorable range, paste compositions were prepared which contain various modifiers. The following pastes were prepared from mixtures of PbO, $RuO_2$, Pb-Zn-Zr-Mn borosilicate glass frit, and one each of a number of modifiers as shown:

TABLE II

| | Weight (in grams) | | | |
|---|---|---|---|---|
| | 1 | 2 | 3 | 4 |
| $PbO_2$ | | 2.0 | | |
| PbO | 2.0 | | 11.2 | 7.5 | 2.5 |
| $RuO_2$ | 4.0 | 4.0 | 9.1 | 7.5 | 2.5 |
| Pb-Zn-Zr-Mn borosilicate | 32.0 | 32.0 | 27.5 | 25.0 | 42.5 |
| $CaF_2$ | 1.5 | 1.5 | 2.0 | 2.0 | 2.5 |
| $Sb_2O_5$ | 0.15 | 0.15 | 0.4 | | |
| $V_2O_3$ | | | | 3.5 | |
| Ethyl cellulose solution | As required for proper viscosity of paste | | | |
| Butyl carbitol | | | | |

Each of these pastes was screen-printed on sintered alumina substrates, dried and fired at peak temperatures between 700 and 900° C., for 18 to 45 minute firing cycles in a moving belt tunnel kiln. Some of the electrical properties of the resulting resistive glaze films are as follows:

TABLE III

| Paste No. | Firing temperature, °C. | Sheet resistance, ohms/square | TCR, p.p.m/ °C. | Noise, db./ decade | Percent Change in resistance at 150° C./ 1,000 hours |
|---|---|---|---|---|---|
| 1 | 800 | 882 | −230 | −27.8 | +0.06 |
| 2 | 750 | 952 | −300 | −28.2 | +0.02 |
| 3 | 800 | 42 | +250 | −39 | |
| 4 | 800 | 106 | +50 | −36.7 | +0.56 |
| 5 | 800 | 345 | +360 | −36 | |

These results show the marked effect on TCR that small additions of $Sb_2O_5$ exert. Note that paste number 5, with no additives, exhibits a positive TCR of +360, even though the concentration of $RuO_2$ is only 5%, whereas paste number 3, with over 18% $RuO_2$, has a lower TCR (+250), because of 0.8% $Sb_2O_5$ addition. $V_2O_3$ also acts as a TCR modifier, without degrading other electrical properties. In addition to $Sb_2O_5$ and $V_2O_3$, $MnO_2$ and $Fe_3O_4$ may be used in similar proportions as modifiers with comparable results. The $CaF_2$ addition in the formulations improved fired film surface textures. The excellent TCR, noise and stability properties of these formulations are of precision resistor quality.

The examples thus far given are, of course, illustrative of the invention in those instances where resistor formulations are prepared suitable for yielding electroconductive glazes. As had been previously indicated, however, resistive bodies in accordance with the present invention may be prepared in the form of so-called volumetric resistors, which is to say resistive bodies in the forms of solid cylinders or the like to which are secured conductive leads. Typically, bodies of this type are formed by combining the metal ruthenate specified in the invention, with electrically insulating refractory ceramic materials such as particulate $Al_2O_3$ or $ZrO_2$. After admixtures such as this are prepared, the composition is pressed to yield a dense, formed structure, end leads being simultaneously or thereafter applied. The body is then fired at elevated temperatures to produce a dense, sintered volumetric resistor.

It will be understood that numerous modifications may be made in the invention as hereinabove described without departing from the spirit of the invention or exceeding the scope thereof as defined in the following claims.

I claim:

1. A composition for the preparation of electrical resistors comprising an electrically nonconductive dispersant, a temporary binder, and a dispersed conductive phase selected from the group consisting of lead ruthenate and mixtures thereof with $RuO_2$.

2. A composition as set forth in claim 1 wherein the dispersed conductive phase is lead ruthenate having the structural formula $Pb_2Ru_2O_6$.

3. A composition as set forth in claim 1 wherein said dispersed conductive phase comprises 1 to 70 percent by weight of the solid constituents of said composition.

4. A composition as set forth in claim 1 wherein said nonconductive dispersant is a glass frit.

5. A composition for the preparation of electrical resistors comprising a finely ground glass frit, temporary binder, a dispersed conductive phase selected from the group consisting of lead ruthenate and mixtures thereof with $RuO_2$, and at least one TCR modifier from the group consisting of $V_2O_3$, $Sb_2O_5$, $MnO_2$ and $Fe_3O_4$.

6. A composition as set forth in claim 5, wherein said dispersed conductive phase comprises 1 to 70 percent by weight of the solid constituents of said composition, said glass frit comprises 30 to 99 weight percent, and said TCR modifier comprises 0 to 10 weight percent.

7. A method of forming an electrical resistance element having high stability, low temperature coefficient and low current noise including the steps of:

forming a mixture of finely ground particles of glass frit, one or more conductive phase materials selected from the group consisting of lead ruthenate and mixtures thereof with $RuO_2$, one or more TCR modifiers selected from the group consisting of $V_2O_3$, $Sb_2O_5$, $MnO_2$ or $Fe_3O_4$, and a temporary binder;

applying a layer of the viscous mixture to a high-temperature-resistant, electrically nonconductive substrate;

heating the substrate and layer to at least the melting temperature of the glass constituent to produce a continuous glassy phase having the metal ruthenate particles uniformly dispersed throughout.

8. A method of forming an electrical resistance element having high stability, low temperature coefficient of resistance and low current noise including the steps of:

forming a mixture of finely ground particles of glass frit, a temporary binder, one or more TCR modifiers selected from the group consisting of $V_2O_3$, $Sb_2O_5$, $MnO_2$ or $Fe_3O_4$, finely divided particles of $RuO_2$, and one or more of the metal oxides, carbonates or nitrates of lead;

applying a layer of the viscous mixture to a high-temperature-resistant, electrically nonconductive substrate;

heating the substrate and layer to a temperature sufficient to cause reaction of the oxide, carbonate, or nitrate of lead with the $RuO_2$ to produce the metal ruthenate $Pb_2Ru_2O_6$ or mixtures thereof with $RuO_2$, or mixtures thereof with excess $RuO_2$, and to a temperature sufficient to melt the glass frit and produce a continuous glassy phase having the metal ruthenate particles so formed and any excess $RuO_2$ particles uniformly dispersed throughout.

9. An electrical resistor element in the form of a glaze film comprising finely divided particles of an electrically conducting material selected from the group consisting of lead ruthenate and mixtures thereof with $RuO_2$ uniformly dispersed in an electrically nonconductive fused glass matrix.

10. An electrically conductive article of manufacture comprising in combination a glaze film containing finely divided particles of an electrically conducting material selected from the group consisting of lead ruthenate and mixtures thereof with $RuO_2$, uniformly dispersed in an electrically nonconductive fused glass matrix bonded to a high-temperature-resistant electrically nonconductive substrate.

11. A resistor body comprising an electrically conductive article selected from the group consisting of lead ruthenate and mixtures thereof with $RuO_2$ dispersed in an electrically nonconducting matrix.

References Cited

UNITED STATES PATENTS 3,573,229   3/1971   Herbst et al. _____ 252—518

OTHER REFERENCES

Chem. Abstracts, vol. 65 (1966) 11516 g.

DOUGLAS J. DRUMMOND, Primary Examiner

U.S. Cl. X.R.

106—53; 117—201

Disclaimer 3,682,840.—*Paul R. Van Loan*, Grand Island, N.Y. ELECTRICAL RESISTOR CONTAINING LEAD RUTHENATE. Patent dated Aug. 8, 1972. Disclaimed filed June 28, 1973, by the assignee, *E. I. du Pont de Nemours and Company*.

Hereby enters this disclaimer to all claims of said patent.

[*Official Gazette February 12, 1974.*]